US011858282B2

(12) United States Patent
Dipaolo et al.

(10) Patent No.: US 11,858,282 B2
(45) Date of Patent: Jan. 2, 2024

(54) SYSTEMS AND METHODS FOR MARKING TABLET-SHAPED ARTICLES

(71) Applicant: MARS, INCORPORATED, McLean, VA (US)

(72) Inventors: Rich A. Dipaolo, Hackettstown, NJ (US); Frank C. Meshach, Stroudsburg, PA (US); Alex A. Hanna, Cleveland, TN (US); Stuart Alan Guinn, Cleveland, TN (US); Ronnie Casteel, Cleveland, TN (US)

(73) Assignee: Mars, Incorporated, McLean, VA (US)

( * ) Notice: Subject to any disclaimer, the term of this patent is extended or adjusted under 35 U.S.C. 154(b) by 96 days.

(21) Appl. No.: 17/431,978

(22) PCT Filed: Feb. 26, 2020

(86) PCT No.: PCT/US2020/019897

§ 371 (c)(1),
(2) Date: Aug. 18, 2021

(87) PCT Pub. No.: WO2020/176618

PCT Pub. Date: Sep. 3, 2020

(65) Prior Publication Data

US 2022/0134771 A1 May 5, 2022

Related U.S. Application Data

(60) Provisional application No. 62/810,766, filed on Feb. 26, 2019.

(51) Int. Cl.
*B41J 3/407* (2006.01)
*B41F 17/36* (2006.01)

(52) U.S. Cl.
CPC ............. *B41J 3/4073* (2013.01); *B41F 17/36* (2013.01)

(58) Field of Classification Search
CPC .................................................... B41J 3/40731
See application file for complete search history.

(56) References Cited

U.S. PATENT DOCUMENTS 4,189,996 A 2/1980 Ackley, Sr.
5,996,768 A 12/1999 Boyce
(Continued)

FOREIGN PATENT DOCUMENTS

TW 201800094 A 1/2018
WO WO-2015008505 A1 * 1/2015 ............. B41J 3/407
WO 2018009617 A1 1/2018

*Primary Examiner* — Shelby L Fidler

(57) ABSTRACT

The disclosed subject matter includes a system for marking tablet-shaped articles. The system includes a hopper and a conveyor. The conveyor has opposing first and second side portions, and at least one pocket is defined in the conveyor between the opposing first and second side portions. The conveyor is configured to receive from the hopper a tablet-shaped article in the at least one pocket. A first window is defined in the first side portion of the conveyor. The first window defining an opening between the pocket and an external environment. The system further includes a first printing head adjacent the first side portion of the conveyor. The first printing head is configured to mark the tablet-shaped article through the first window.

16 Claims, 4 Drawing Sheets

(56) References Cited

U.S. PATENT DOCUMENTS

| | | | | |
|---|---|---|---|---|
| 2003/0035870 | A1* | 2/2003 | Ackley, Jr. | B41J 3/4073 426/383 |
| 2004/0094050 | A1 | 5/2004 | Ackley | |
| 2008/0152756 | A1 | 6/2008 | Ream | |
| 2009/0241482 | A1* | 10/2009 | Yagyu | B65B 35/08 53/540 |
| 2009/0256897 | A1* | 10/2009 | Polk | B41J 3/40731 101/44 |
| 2011/0132729 | A1 | 6/2011 | Chisholm | |
| 2015/0083548 | A1 | 3/2015 | Ackley | |
| 2016/0136966 | A1* | 5/2016 | Cassoni | B41J 2/01 347/37 |
| 2018/0236760 | A1* | 8/2018 | Imai | B41F 17/36 |

* cited by examiner

SYSTEMS AND METHODS FOR MARKING TABLET-SHAPED ARTICLES

CROSS-REFERENCE TO RELATED APPLICATION

This application claims priority to U.S. Application No. 62/810,766, filed on Feb. 26, 2019, which is hereby incorporated by reference in its entirety.

BACKGROUND

The disclosed subject matter is directed to systems and methods for printing or marking tablet-shaped articles.

Printers for printing tablet-shaped medicament, e.g., analgesic tablets, and candies, e.g., M&M's® chocolate candies, have been used to indicate product identification logos and marks. For example, a tablet-shaped article can be fully produced and then subjected to a printing process, such as marking or printing one surface of the tablet-shaped article while leaving an opposing surface of the tablet-shaped article unmarked. In addition to identification logos and marks, printing tracking marks using a bar code and the like on medicament tablets can be useful, for example, to discourage counterfeit products. Printing or marking a surface of an already produced tablet-shaped article is often referred to as post-production printing. Another example of using post-production printing on a tablet-shaped article is personalizing the article, including printing marks or other personalized information.

Systems for post-production printing on tablet-shaped articles often convey the articles on a continuous conveyor that is made of a multitude of articulately connected conveyor bars, which is moved with a driver system, such as a chain drive. The printer prints on the exposed topside of the tablet-shaped article as the article is carried on the conveyor bar. The conveyor bar can also include one or more holding cavities having voids on an underside of thereof such that some portion of the underside of the articles can be exposed and can be printed through the void of the conveyor bar. Rotogravure printers, inkjet printers, and other types of printing mechanisms have been known to be used for post-production printing. Of these, inkjet printers can be particularly suitable for applications in which markings or information to be printed on the article need to be changed frequently. However, known printing systems often have too many moving parts, which can increase cost and the likelihood of failure. For example, conveyors having many moving parts, such as chain drives, can be prone to jamming Ink residues from the printer can accumulate around the moving parts of the printer and conveyor and can cause printer malfunctions. Accordingly, there is a need in the art to have a printer or printer system with fewer moving parts and a simpler conveying system.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages, and in accordance with the purpose of the disclosed subject matter, as embodied and broadly described, the disclosed subject matter includes a system for marking tablet-shaped articles. The system includes a hopper and a conveyor. The conveyor has opposing first and second side portions, and at least one pocket is defined in the conveyor between the opposing first and second side portions. The conveyor is configured to receive from the hopper a tablet-shaped article in the at least one pocket. A first window is defined in the first side portion of the conveyor. The first window defining an opening between the pocket and an external environment. The system further includes a first printing head adjacent the first side portion of the conveyor. The first printing head is configured to mark the tablet-shaped article through the first window.

Systems in accordance with the disclosed subject matter can include an article aligner disposed proximate an exit path of the hopper. The article aligner can define a channel having a longitudinal dimension. A width dimension of the channel can be greater than a thickness dimension of articles to be dispensed from the hopper and less than a width dimension of the articles to be dispensed from the hopper.

Conveyors in accordance with the disclosed subject matter can be rotary wheel conveyors. The rotary wheel conveyor can include an inner wheel portion and a plurality of outer wheel portions coupled to the inner wheel portion. The at least one pocket can be defined in at least one of the plurality of outer wheel portions. In accordance with an aspect of the disclosed subject matter, the rotary wheel conveyor can include a plurality of outer wheel portions along an outer periphery thereof, and each of the plurality of outer wheel portions can be removable from the rotary wheel conveyor and configured to be replaced by another outer wheel portion. The at least one pocket can be defined in at least one of the plurality of outer wheel portions.

In accordance with an aspect of the disclosed subject matter, the pocket can include a U-shape in front view. The conveyor can include at least one pressure port in communication with the at least one pocket.

Systems in accordance with the disclosed subject matter can include an inspection system. The inspection system can be configured to control the first printing head to print on the tablet-shaped article through the first window. In accordance with an aspect of the disclosed subject matter, the system can include an article rotator configured to rotate the tablet-shaped article and orient a first surface of the tablet-shaped article towards the first side portion of the conveyor.

In accordance with an aspect of the disclosed subject matter, the first printing head can include at least one of an inkjet printer, laser printer, and laser etching-printer.

In accordance with an aspect of the disclosed subject matter, a second window can be defined in the second side portion of the conveyor. The second window can define a second opening between the pocket and the external environment. The system can include a second printing head adjacent the second side portion, and the second printing head can be configured to mark the tablet-shaped article through the second window.

The disclosed subject matter also includes methods for marking tablet-shaped articles. Methods in accordance with the disclosed subject matter include providing a system for marking tablet-shaped articles as described above. Methods in accordance with the disclosed subject matter further include disposing at least one tablet-shaped article in the system's hopper and dispensing the at least one tablet-shaped article from the hopper into the at least one pocket defined in the conveyor. Methods in accordance with the disclosed subject matter further include conveying the at least one tablet-shaped article from the hopper to the first print head and marking the at least one tablet-shaped article with the first printing head. In accordance with the disclosed subject matter, the first printing head marks the at least one tablet-shaped article through the first window.

Dispensing the at least one tablet-shaped article can include passing the tablet-shaped article through an article aligner. In accordance with an aspect of the disclosed subject matter, the conveyor can be a rotary wheel conveyor and the rotary wheel conveyor can rotationally transfer the at least one tablet-shaped article from the hopper. Conveying the at least one tablet-shaped article can include applying a vacuum to a pressure port in communication with the at least one pocket to retain the at least one tablet-shaped article in the at least one pocket. The method can additionally or alternatively include applying a positive pressure to the pressure port to eject the at least one tablet-shaped article from the conveyor.

In accordance with an aspect of the disclosed subject matter, conveying the at least one tablet-shaped article can include detecting the presence of a marking on the tablet with an inspection station and instructing the first printer to mark the tablet-shaped article when no marking is detected. Methods can additionally or alternatively include rotating the at least one tablet-shaped article to orient an unmarked face of the tablet-shaped article towards the first side portion of the conveyor when a marking is detected.

As described above, systems in accordance with the disclosed subject matter can include a second window defined in the second side portion of the conveyor. In accordance with an aspect of the disclosed subject matter, methods can include marking the at least one tablet-shaped article through the second window with a second printing head.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the systems and methods of the disclosed subject matter. Together with the description, the drawings serve to explain the principles of the disclosed subject matter.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
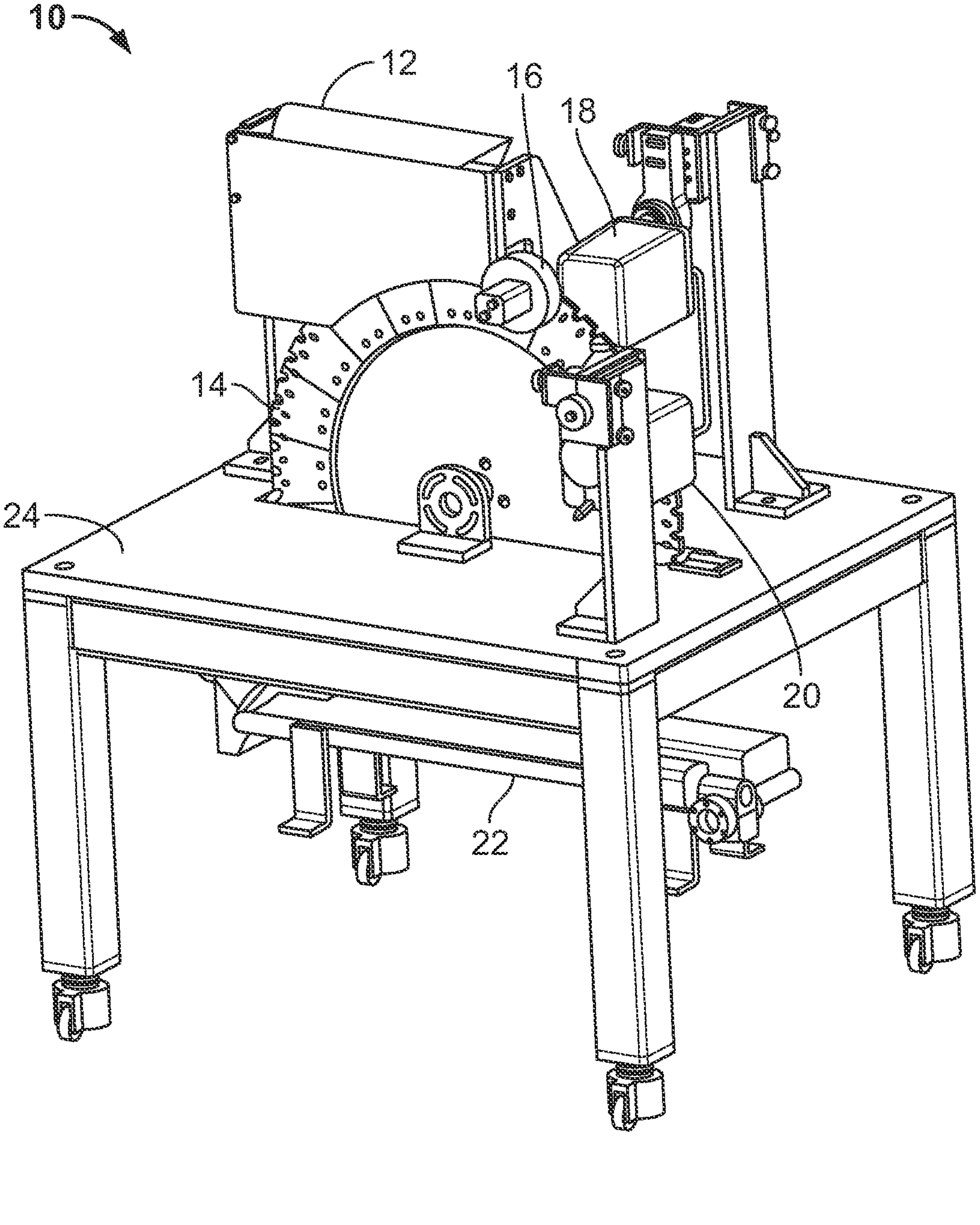
FIG. 1 illustrates a perspective view of a system for marking tablet-shaped articles in accordance with the disclosed subject matter, the system disposed on a movable table.

Reference will now be made in detail to the various non-limiting exemplary embodiments of the disclosed subject matter, non-limiting exemplary embodiments of which are illustrated in the accompanying drawings. The structure and corresponding method of operation of the disclosed subject matter will be described in conjunction with the detailed description of the system.

The presently disclosed subject matter relates generally to systems, methods, and devices for marking tablet-shaped articles. The presently disclosed subject matter is particularly suited for post-production marking and/or printing on tablet-shaped articles, such as candies.

The terms used in this specification generally have their ordinary meanings in the art, within the context of the present disclosure and in the specific context where each term is used. Certain terms are discussed below, or elsewhere in the specification, to provide additional guidance to the practitioner in describing the systems and methods of the present disclosure and how to make and use them.

Throughout the description and claims of this specification, the words “comprise” and “contain” and variations of the words, for example “comprising” and “comprises,” mean “including but not limited to,” and do not exclude other components, integers or steps. Moreover, the singular encompasses the plural unless the context otherwise requires. In particular, where the indefinite article is used, the specification is to be understood as contemplating plurality as well as singularity, unless the context requires otherwise.

As used herein, the use of the word “a” or “an” when used in conjunction with the term “comprising” in the claims and/or the specification can mean “one,” but it is also consistent with the meaning of “one or more,” “at least one,” and “one or more than one.” Still further, the terms “having,” “including,” “containing” and “comprising” are interchangeable and one of skill in the art is cognizant that these terms are open ended terms.

The term “about” or “approximately” means within an acceptable error range for the particular value as determined by one of ordinary skill in the art, which will depend in part on how the value is measured or determined, i.e., the limitations of the measurement system. For example, “about” can mean within 3 or more than 3 standard deviations, per the practice in the art. Alternatively, “about” can mean a range of up to 20%, up to 10%, up to 5%, or up to 1% of a given value. Alternatively, particularly with respect to biological systems or processes, the term can mean within an order of magnitude, within 5-fold, or within 2-fold, of a value.

Preferred features of each aspect of the presently disclosed subject matter can be as described in connection with any of the other aspects. Within the scope of this application, it is expressly intended that the various aspects, embodiments, examples and alternatives set out in the preceding paragraphs, in the claims and/or in the following description and drawings, and in particular the individual features thereof, can be taken independently or in any combination. That is, all embodiments and/or features of any embodiment can be combined in any way and/or combination, unless such features are incompatible. The present disclosure will now be described more fully hereinafter with reference to the accompanying drawings, which form a part hereof, and which show, by way of illustration, certain example embodiments. Subject matter can, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter can be embodied as methods, devices, components, or systems. The following detailed description is, therefore, not intended to be taken in a limiting sense.

The disclosed subject matter is directed to printing on tablet-shaped articles, such as for purposes of example drugs and candies. Tablet-shaped articles suitable for the present printer include medicinal tablets or pills, such as Advil® ibuprofen tablets and Tylenol® acetaminophen tablets, candies, such as M&M's chocolate candies, Skittles® fruity candies and Reese's™ Pieces candies, and tablet gums, such as Orbit® gum tablets. A tablet-shaped article as used herein can have two opposing surfaces joined by a continuous transitional surface that connects the two opposing surfaces. The two opposing surfaces can be flat surfaces or have a convex or concave contour. The shape of the opposing surfaces can be any geometric shape, including a circle, oval, square or rectangle, and the transitional surface can be flat or curved. The diameter or width of each opposing surface can be larger than the width of the transitional surface such that the thickness of the tablet-shaped article is smaller than the diameter or width of the opposing surfaces. Tablet-shaped articles suitable for use with the disclosed subject matter can be relatively small such that one or more of the articles can be easily handled. Examples of tablet-shaped articles in accordance with the disclosed subject matter include medicament tablets and candies, as noted above.

Systems in accordance with the disclosed subject matter include a hopper and a conveyor. The conveyor has opposing first and second side portions, and at least one pocket is defined in the conveyor between the opposing first and second side portions. The conveyor is configured to receive from the hopper a tablet-shaped article in the at least one pocket. A first window is defined in the first side portion of the conveyor. The first window defines an opening between the pocket and an external environment. The system further includes a first printing head adjacent the first side portion of the conveyor. The first printing head is configured to mark the tablet-shaped article through the first window. Printing systems in accordance with the disclosed subject matter can have fewer moving parts such that the printer can be operated reliably with less maintenance downtime of operation, such as for cleaning and replacing parts. In addition, printers and systems in accordance with the disclosed subject matter can have a compact profile and can be suitable as a mobile printer. Hereinafter, the terms printing and marking are used to indicate printing and marking by applying inks, etching a thin layer from the surface, or causing a change in color on the surface of a tablet-shaped article.

A non-limiting exemplary embodiment of a system in accordance with the disclosed subject matter for marking and/or printing marks or information on tablet-shaped articles is illustrated with reference to FIG. 1. The system 10 includes a hopper 12 and a conveyor 14. The hopper 12 can hold a multitude of tablet-shaped articles and can dispense the tablet-shaped articles onto the conveyor 14. As embodied herein, the bottom of the hopper can include an article aligner disposed proximate an exit path of the hopper 12. The article aligner can align the tablet-shaped articles in a row for dispensing the tablet-shaped articles onto the conveyor 14 in a desired orientation. For example, the article aligner can align tablet-shaped articles in a vertical orientation, with the tablet-shaped articles standing on their respective transitional surfaces.

Figure 2:
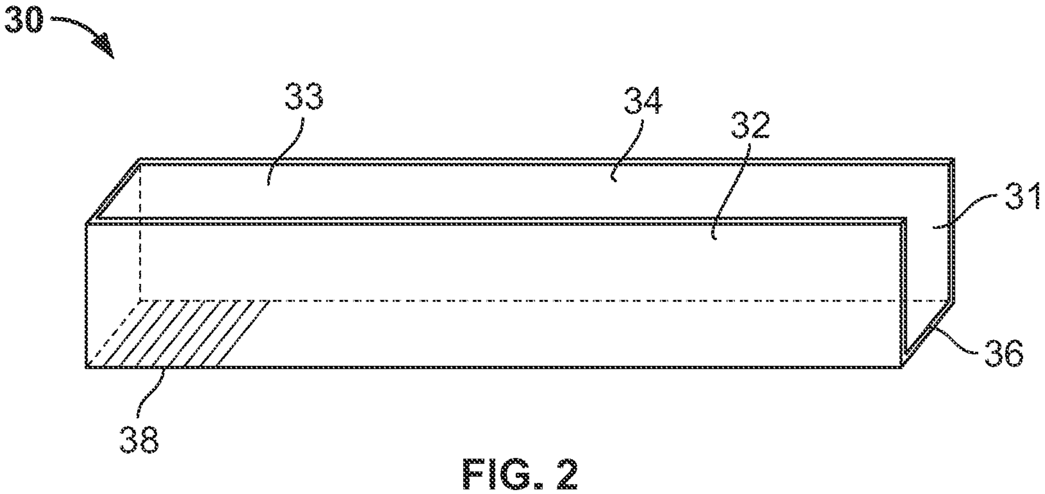
FIG. 2 illustrates a perspective view of an article aligner of the system of FIG. 1.

A non-limiting exemplary article aligner 30 is illustrated in FIG. 2. As embodied herein, the article aligner can define a channel 31 having a longitudinal dimension. As embodied herein channel 31 can be defined between two vertical panels 32 and 34, and a bottom panel 36, and from an open end to a closed end. As embodied herein, the three panels can form a U-shaped channel or slot with an upper opening 33. The bottom panel 36 can have a bottom panel width that is slightly larger than the thickness of the tablet-shaped articles to be dispensed, but smaller than the width or diameter of the opposing surfaces of the tablet-shaped articles to be dispensed. The upper opening 33 can have an opening width substantially similar to the bottom panel width. The channel 31 can have a width dimension greater than a thickness dimension of articles to be dispensed from the hopper and less than a width dimension of articles to be dispensed from the hopper. The upper opening 33 of the article aligner 30 can allow tablet-shaped articles in the hopper to drop into the channel or slot 31, thereby the tablet-shaped articles can form a line of consecutively placed tablet-shaped articles in a linear row in a vertically oriented position. For example, the tablet-shaped articles can be oriented with the two opposing surfaces of the tablet-shaped articles facing the two vertical panels 30 and 32 and the tablet-shaped articles standing on their respective transitional surfaces in the channel 31. As embodied herein, one end of the bottom horizontal panel 36 can include a bottom opening 38, which is slightly larger than the table-shaped articles to be dispensed, such that the tablet-shaped articles positioned above the bottom opening 38 can pass through the bottom opening 38, one at a time. For example, the end of the article aligner 30 opposite the bottom opening 38 can be elevated such that tablet-shaped articles placed in the article aligner 30 move down towards the bottom opening 38 by gravity and fall therethrough. Alternatively or additionally, there can be a mechanical advancing mechanism to move the tablet-shaped articles through the article aligner 30. For purpose of example, the advancing mechanism can include a vibrational mechanism or rotary advancing mechanism. Additionally or alternatively, the hopper 12 can include a mechanism that vibrates the hopper 12. Vibrating the hopper can cause the tablet-shaped articles disposed in the hopper 12 to move towards the article aligner 30 and the bottom opening 38.

In accordance with another aspect of the disclosed subject matter, the hopper 12 can include an opening at the bottom of the hopper 12. The opening can have a shape and dimensions substantially similar to a shape and dimensions of a vertically standing tablet-shaped article to be dispensed, such that the tablet-shaped articles fall through the bottom opening of the hopper, one at a time and properly aligned. As embodied herein, the hopper 12 can be mounted to a table 24. The table 24 can provide a sturdy surface for mounting components of the system. The table 24 can be moveable, such as on wheels, which can facilitate movement of the system 10 to the desired location.

Figure 3:
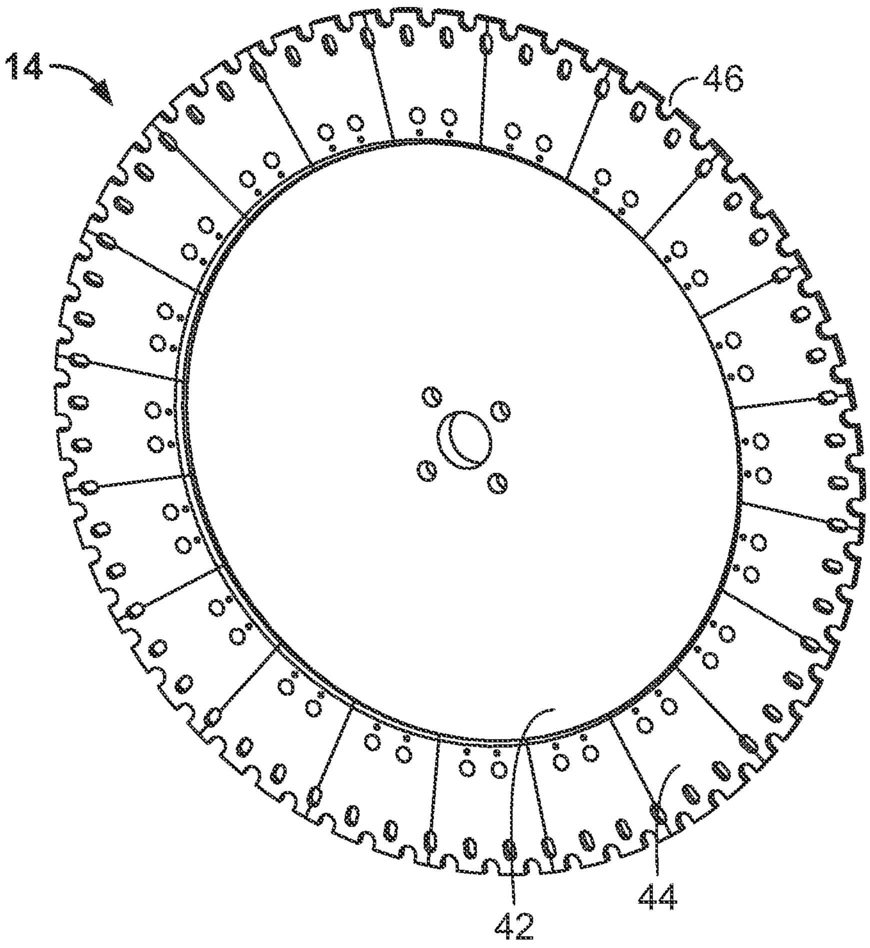
FIG. 3 illustrates a perspective view of the conveyor of the system of FIG. 1.

Systems in accordance with the disclosed subject matter further include a conveyor 14. As embodied herein, the conveyor can be a rotary wheel conveyor. The rotary wheel conveyor can rotationally transfer the at least one tablet-shaped article from the hopper. With reference to the non-limiting exemplary system 10 depicted in FIG. 1, the rotary wheel conveyor 14 can be placed under the bottom opening 38 of the article aligner 30 disposed proximate the exit path of the hopper 12 to receive tablet-shaped articles coming out of the hopper 12. FIG. 3 illustrates an example of a rotary wheel conveyor 14 in accordance with an aspect of the disclosed subject matter. The rotary wheel conveyor 14 can be fabricated from a rigid material, such as aluminum, steel, iron or copper, and fabricated to be a one-piece wheel or have different sections. The rotary wheel conveyor 14 can be driven by a motor to rotate it along the center of the rotary wheel conveyor. As embodied herein, the rotary wheel conveyor 14 can be driven directly by a gear motor. Using direct drive can control movement of the conveyor using fewer components. For example, systems in accordance with the disclosed subject matter using direct drive do not require a chain threaded around sprockets, or other features such as pulleys and belts to drive the conveyor. As described further herein, systems utilizing pulleys and belts, for example, to control motion of a conveyor can require additional maintenance and downtime. Rotary wheel conveyors can also assist with drying of printed ink on tablet-shaped articles after printing. For example, the tablet-shaped articles can continue drying in the conveyor as they are rotationally advanced.

As embodied herein, the rotary wheel conveyor 14 has an inner wheel portion 42, and a plurality of outer wheel portions 44 coupled to the inner wheel portion 42. The plurality of the outer wheel portions 44 can together define an outer circumference of the rotary wheel conveyor 14. As embodied herein, the plurality of outer wheel portions 44 can also define an inner surface that securely couples with the inner wheel portion 42 to form the rotary wheel conveyor 14. As embodied herein, each of the plurality of outer wheel portions 44 can be removable from the rotary wheel conveyor 14 and configured to be replaced by another outer wheel portion. As described further herein, the at least one pocket 46 can be defined in at least one of the plurality of outer wheel portions 44. One advantage of using the multi-portion outer wheel design is that each outer wheel portion 44 can be individually replaced. As such, if one outer wheel portion is damaged, it can be quickly and easily replaced while the remaining outer portions remain affixed to the inner wheel portion. Furthermore, each outer wheel portion can be the same to receive the same sized tablets therein or can be different to accommodate different shapes and sizes of the tablet-shaped articles.

Figure 4:
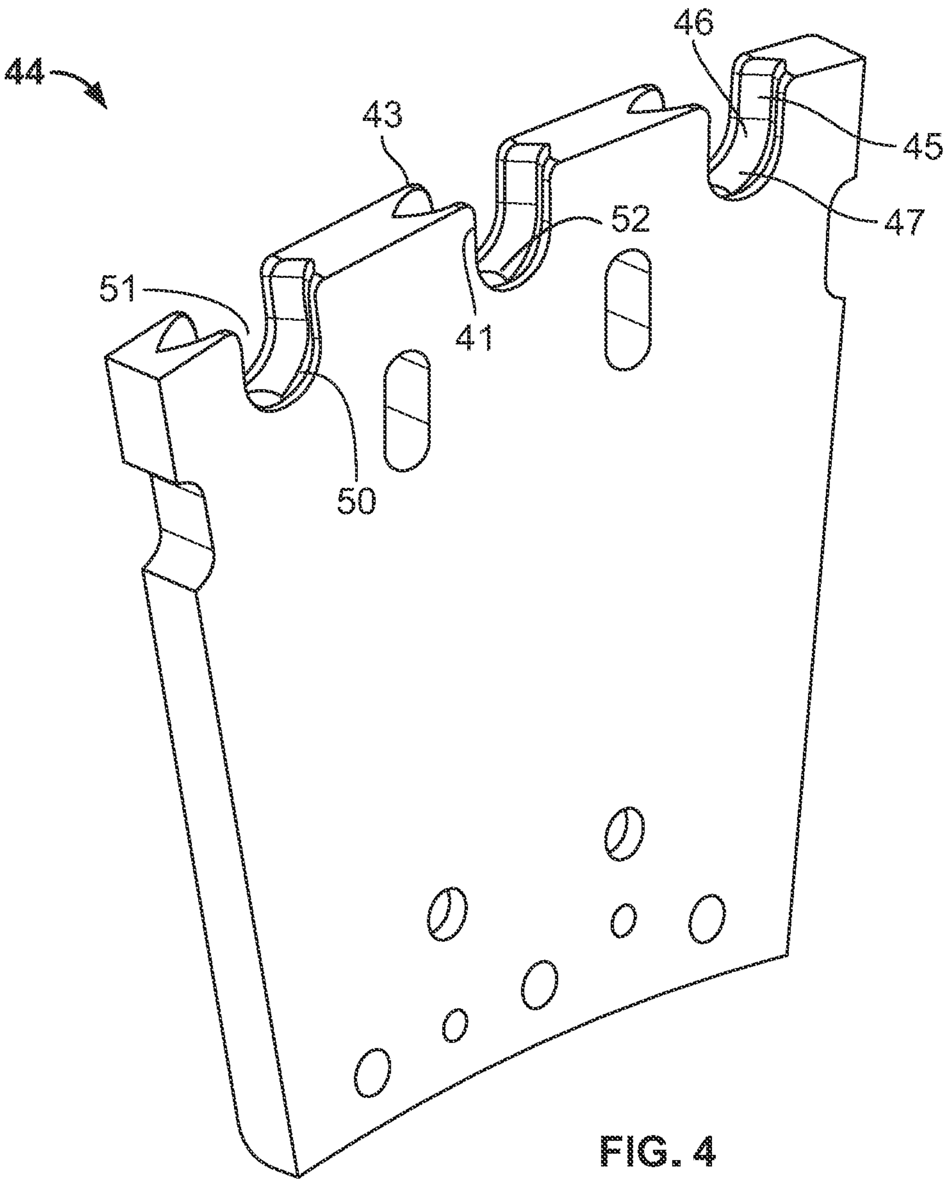
FIG. 4 illustrates a partial detail perspective view of an outer portion of the conveyor of FIG. 3.

In accordance with the disclosed subject matter, the conveyor includes opposing first and second side portions 41, 43 and at least one pocket 46 defined in the conveyor between the opposing first and second side portions 41, 43. With reference to FIG. 3, the at least one pocket 46 can be defined along the outer circumference of the rotary wheel conveyor 14. For example, and as embodied herein, the at least one pocket 46 can be defined in at least one of the plurality of outer wheel portions 44. The at least one pocket 46 is configured to receive a tablet-shaped article from the hopper 12. As embodied herein, each pocket 46 can be configured to receive and reversibly hold one of the tablet-shaped articles. There can be a plurality of pockets 46 defined in the conveyor 14. For example but not for limitation, at least three pockets 46 can be defined in each of the outer wheel portions 44, as depicted in FIG. 4.

Figure 5:
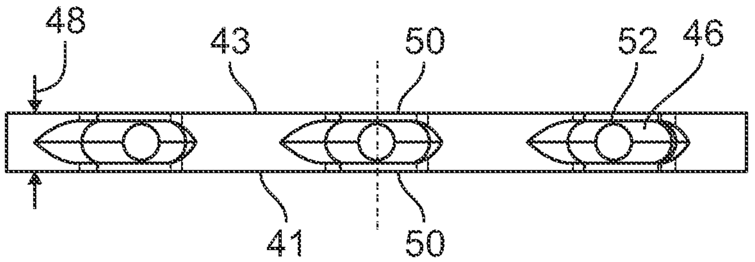
FIG. 5 illustrates a top view of the conveyor of FIG. 3.

The at least one pocket 46 can have different shapes, including the lower holding section of the pocket as further described below. The non-limiting exemplary system in accordance with the disclosed subject matter is described with reference to a circular tablet-shaped article, for illustration purposes. FIGS. 4 and 5 illustrate pockets 46 that are adapted to handle (i.e., hold and carry) one or more circular tablet-shaped articles. As embodied herein, the pocket 46 can have a U-shape in front view such that the circular tablet-shaped article can be snuggly placed in the pocket 46. The U-shape can be characterized as an upper longitudinal section 45 and a lower holding section 47. The depth of the pocket 46, including the upper longitudinal section 45 and the lower holding section 47, can be configured at least as deep as the diameter or width of the tablet-shaped article to be conveyed. As such, the tablet-shaped article can be disposed completely within the at least one pocket 46. As embodied herein, the at least one pocket 46 can have a pocket thickness 48 measured between the opposing first and second side portions 41, 43. The pocket thickness 48 can be larger than a thickness of the tablet-shaped article to be conveyed such that the at least one pocket 46 can hold the tablet-shaped article in a vertically standing position. The dimensions of the pocket 46 are such that the tablet-shaped article is completely held within the pocket 46 of the rotary wheel conveyor, except for the windows 50 that are fabricated to expose one or both of the two opposing surfaces of the tablet-shaped article, as described further below.

As embodied herein, the shape of the lower holding section 47 of the at least one pocket 46 resembles or substantially resembles at least the lower half of the vertically standing tablet-shaped article to be conveyed. The dimensions of the at least one pocket 46 can be selected such that the tablet-shaped article snugly fits into the pocket and can rest on the lower holding section 47 of the pocket 46 when the at least one pocket 46 is in an upright orientation, with the upper longitudinal section 45 above the lower holding section 47. As embodied herein, the dimensions of the pocket 46 can be slightly larger than the dimensions of the tablet-shaped article to be conveyed for tolerances and the like, such that the tablet-shaped article can move in and out of the pocket 46 under gravitational forces without requiring additional mechanical force and without substantial friction. For example, and as embodied herein, tablet-shaped articles to be conveyed can be received in the at least one pocket 46 with the pocket in an upright orientation with the upper longitudinal section 45 above the lower holding section 47. As the conveyor 14 turns, the at least one pocket 46 can transition to a downward facing orientation, with the upper longitudinal section 45 below the lower holding section 47. Conveyed tablet-shaped articles can be dispensed from the conveyor with the pocket in a downward facing configuration. As embodied herein, the tablet-shaped articles can be dispensed into a collection basket 22.

The dimensions of the pocket can be selected such when the tablet-shaped article is received in the at least one pocket 46 and sits in the lower holding section 47, the tablet-shaped article does not tilt from side to side or move around within the pocket 46. For example, the pocket thickness and the pocket width of the lower holding section 47 of the pocket can be less than 2 mm, desirably less than 1 mm, larger than the thickness and width, respectively, of the tablet-shaped article to be conveyed.

As embodied herein, the at least one pocket 46 has an upper opening 52 with opening dimensions larger than the dimensions of the tablet-shaped article to be conveyed. For example, the upper opening 52 can have opening thickness and opening width dimensions larger than the pocket thickness and the pocket width of the lower holding section 47 of the pocket 46 so that the tablet-shaped articles can freely (i.e., without any frictional or other dimensional restrictions)

move in and out of the pocket 46 through the upper opening 52. For example, the opening thickness and the opening width of the upper opening 52 of the pocket 46 can be less than 4 mm, desirably less than 3 mm, larger than the thickness and width, respectively, of the tablet-shaped article to be conveyed. The dimensions of the at least one pocket 46 can gradually transition from the upper opening 52 to the lower holding section 47 of the pocket 46 through the upper longitudinal section 45, which can ensure uninterrupted, smooth passage between the two sections.

As embodied herein, and with reference to FIG. 5, the conveyor can include at least one pressure port 52 in communication with the at least one pocket 46. The pressure port 52 can apply vacuum to hold the tablet-shaped article in the pocket 46. As embodied herein, the pressure port 52 can be placed at the lowest point of the lower holding section 47. As further described herein, the pressure port 52 can additionally or alternatively apply a positive pressure to eject the at least one tablet-shaped article from the conveyor. For example, a positive pressure can be applied to eject the tablet-shaped article after the article has been marked. Additionally or alternatively, the system may include one or more clean out brushes, and the one or more clean out brushes can be used to help extract tablet-shaped articles from the at least one pocket 46 in the conveyor after the tablet-shaped article has been printed or marked.

In accordance with the disclosed subject matter, the first side portion 41 of the conveyor 14 defines a first window 50. The first window 50 comprises an opening between the pocket and an external environment. As embodied herein, the first window 50 can expose a surface of the tablet-shaped article when the tablet-shaped article is placed in the pocket 46, and the exposed surface of the tablet-shaped article can be printed through the first window 50. The dimensions of the first window 50 can be smaller than the width of the tablet-shaped article to be marked to prevent the tablet-shaped article from slipping out of the pocket 46 through the first window 50. As embodied herein, the first window 50 can expose a center area of one of the opposing surfaces of the tablet-shaped article. The first window 50 can be an opening defined in the lower holding section 47 of the at least one pocket 46. Alternatively, and as embodied herein, the first window can be an elongated opening extending from the upper opening 52 to the lower holding section 47 of the at least one pocket 46.

With reference to FIG. 1, systems in accordance with the disclosed subject matter include a first printing head 18 adjacent the first side portion 41 of the conveyor 14. As embodied herein, the first printing head 18 can be provided, such as mounted to the table 24. As further described herein, the first printing head 18 is configured to mark or print the tablet-shaped article through the first window 50 as the tablet-shaped article is passed by the first printing head 18 by the conveyor 14. Printers in accordance with the disclosed subject matter can include non-contact marking printers, such as inkjet printers, laser printers, and laser etching-printers. Suitable printers and inks are known and for example disclosed in U.S. Pat. No. 7,597,752, which is hereby incorporated by reference in its entirety. Particularly suitable printers and edible inks can produce edible products.

In accordance with an aspect of the disclosed subject matter, and with reference to FIG. 4, the second side portion 43 of the conveyor 14 can define a second window 51. The second window 51 can have any of the features described above with respect to the first window 50. As embodied herein, the first and second windows 50, 51 can have matching configurations. Alternatively, the first and second windows 50, 51, can have different configurations. The first window 50, second window 51 and space therebetween can be fluidly coupled with each other, as shown in FIG. 4.

As embodied herein, and with reference to FIG. 1, systems in accordance with the disclosed subject matter can include a second printing head 20 adjacent the second side portion 43 of the conveyor 14. The second printing head 20 can be configured to mark the tablet-shaped articles through the second window. For example, the system 10 can be configured with the first printing head 18 and the second printing head 20 configured to mark tablet-shaped articles on each opposing surface of the tablet-shaped article through the first and second window of the conveyor, respectively.

As embodied herein, and with reference to FIG. 1, systems in accordance with the disclosed subject matter can include an inspection station 16. The inspection station can inspect and detect potential issues in the system for at least two aspects. First, the inspection station can inspect and detect, for example through the first window 50 and/or the second window 51, that there is a tablet-shaped article in the at least one pocket 46. Second, when a tablet-shaped article is present in the pocket 46, the inspection station can inspect and determine whether there is any marking or printing on the surface of the tablet-shaped article exposed through the first window 50. Additionally or alternatively, the inspection station can inspect the opposing surface of the tablet-shaped article, for example through the second window 51, to determine if there is any marking or printing on the opposing surface of the tablet-shaped article. The inspection information of whether there is a (previously applied or otherwise) printing on one or both of the opposing surfaces of the tablet-shaped article can be communicated by signal or the like to a central processing unit (CPU) and stored for further system optimization. In accordance with one aspect of the disclosed subject matter, if tablet-shaped articles that have pre-applied printing on one of their opposing surfaces are supplied to the hopper 12, a new marking or printing can be applied on the unmarked opposing surface of the tablet-shaped articles. Algorithms suitable for such inspection stations are known in the art.

In accordance with an aspect of the disclosed subject matter, the system 10 can include an article rotator configured to rotate the tablet-shaped article and orient a first surface of the tablet-shaped article towards the first side portion 41 of the conveyor 14. The rotating mechanism can be a robotic manipulating device, for example. An article rotator can be used, for example, in systems configured with only a first printer head 18. For example, the tablet-shaped article rotator can be disposed between the inspection station and the printing head. Based on the result of the inspection, if an unmarked surface of the tablet-shaped article is not oriented towards the first printing head 18, the article rotator can remove the tablet-shaped article from the pocket 46, rotate the tablet-shaped article, and insert the tablet-shaped article back into the pocket 46 with the unmarked side oriented towards the printing head 18.

The disclosed subject matter also includes methods for marking tablet-shaped articles. Methods in accordance with the disclosed subject matter include providing a system for marking tablet-shaped articles having any combination of the features described above. Methods in accordance with the disclosed subject matter further include disposing at least one tablet-shaped article in the system's hopper and dispensing the at least one tablet-shaped article from the hopper into the at least one pocket defined in the conveyor. Methods in accordance with the disclosed subject matter further include conveying the at least one tablet-shaped article from the hopper to the first printing head and marking the at least one tablet-shaped article with the first printing head. In accordance with the disclosed subject matter, the first printing head marks the at least one tablet-shaped article through the first window.

With reference to the non-limiting exemplary system 10 depicted in FIG. 1, the hopper 12 can include an opening at the bottom of the hopper 12, and tablet-shaped articles can be dispensed out the hopper 12 through the opening one at a time into a pocket 46 of the rotary wheel conveyor 14 when the opening at the bottom of the hopper 12 and the pocket 46 are aligned as the rotary wheel conveyor 14 rotationally advances under the opening. In accordance with an aspect of the disclosed subject matter, the system can include an article aligner, as described above, and dispensing the at least one tablet-shaped article can include passing the tablet-shaped article through the article aligner.

Methods in accordance with the disclosed subject matter further include conveying the at least one tablet-shaped article from the hopper to the first print head 18. As embodied herein, the rotary wheel conveyor 14 can rotationally advance the pocket 46 with the tablet-shaped article therein from the hopper 12 to an inspection station 16, and the inspection station can inspect the tablet-shaped article as described above. For example, the inspection station 16 can detect the presence of a marking on the tablet-shaped article and instruct the first printer 18 to mark the tablet-shaped article when no marking is detected. After the inspection station 16, the conveyor can convey the tablet-shaped article to the first printing station 18. In accordance with an aspect of the disclosed subject matter, the system can include an article rotator as described above, and if the inspection 16 detects that the surface of the tablet-shaped article oriented towards the first printing head 18 has previously been marked, the article rotator can rotate the at least one tablet-shaped article to orient an unmarked surface of the tablet-shaped article towards the first side portion of the conveyor and the first printing head 18.

Methods in accordance with the disclosed subject matter further include marking the at least one tablet-shaped article, wherein the first printing head 18 marks the at least one tablet-shaped article through the first window 50. In accordance with an aspect of the disclosed subject matter, the system can include a second window defined in the second side portion of the conveyor, as described further above. With reference to FIG. 1, the non-limiting exemplary system 10 includes a first printing head 18 and a second printing head 20. As embodied herein, the first printing head 18 can be adjacent the first side portion 41 of the rotary wheel conveyor 14 and the second printing head 20 can be adjacent the second side portion 43 of the rotary wheel conveyor 14. For purpose of example, and as embodied herein, the first printing head 18 and the second printing head 20 can be mounted adjacent the respective side portions of the conveyor 14 using brackets attached to the table 24. As embodied herein, the first printing head 18 and the second printing head 20 can be mounted in series, such that the conveyor can convey the tablet-shaped articles past the first print head 18, followed by the second printing head 20. Alternatively, the first printing head 18 and the second print head 20 can be mounted opposite one another, such that the conveyor conveys the tablet-shaped article past the first printing head 18 and the second print head 20 at the same time.

Methods in accordance with the disclosed subject matter can include marking the at least one tablet-shaped article through the second window 51 with the second printing head 20. For example, based on the inspection information obtained from the inspection station 16 and stored in the CPU, one or both of the printing heads can be instructed to mark or print on one surface or both opposing surfaces of the tablet-shaped article. One aspect of the disclosed subject matter is directed to printing tablet-shaped articles that have pre-printed information on one of the opposing surfaces of the tablet-shape article. For example, a new printing can be applied on the unmarked opposing surface of the tablet-shaped article, and the pre-printed information can remain on the pre-printed opposing surface without further marking. For example, the CPU can instruct one of the first printing head 18 or the second printing head 20 that is aligned with the unmarked surface of the tablet-shaped article to apply printing. The new information applied on the unmarked surface can be any information, for example, tracking information, identification mark, bar code, or a legible message. In accordance with another aspect of the disclosed subject matter, the system can be programmed to print on the pre-printed surface of the tablet-shaped article, thereby adding or supplementing additional information.

After the tablet-shaped articles are printed, the tablet-shaped articles can be discharged from the rotary wheel conveyor 14. The tablet-shaped articles can be gravitationally discharged as the rotary wheel conveyor rotationally advances to position the upper opening 52 and the pocket 46 to allow the tablet-shaped article to gravitationally roll or slide out through the upper opening 52. Alternatively, the tablet-shaped article can be pneumatically discharged by applying positive air pressure, for example, through the pressure port 52. The discharged tablet-shaped articles can then be collected and advanced for further processing, such as packaging or an additional inspection for printing quality.

Figure 6:
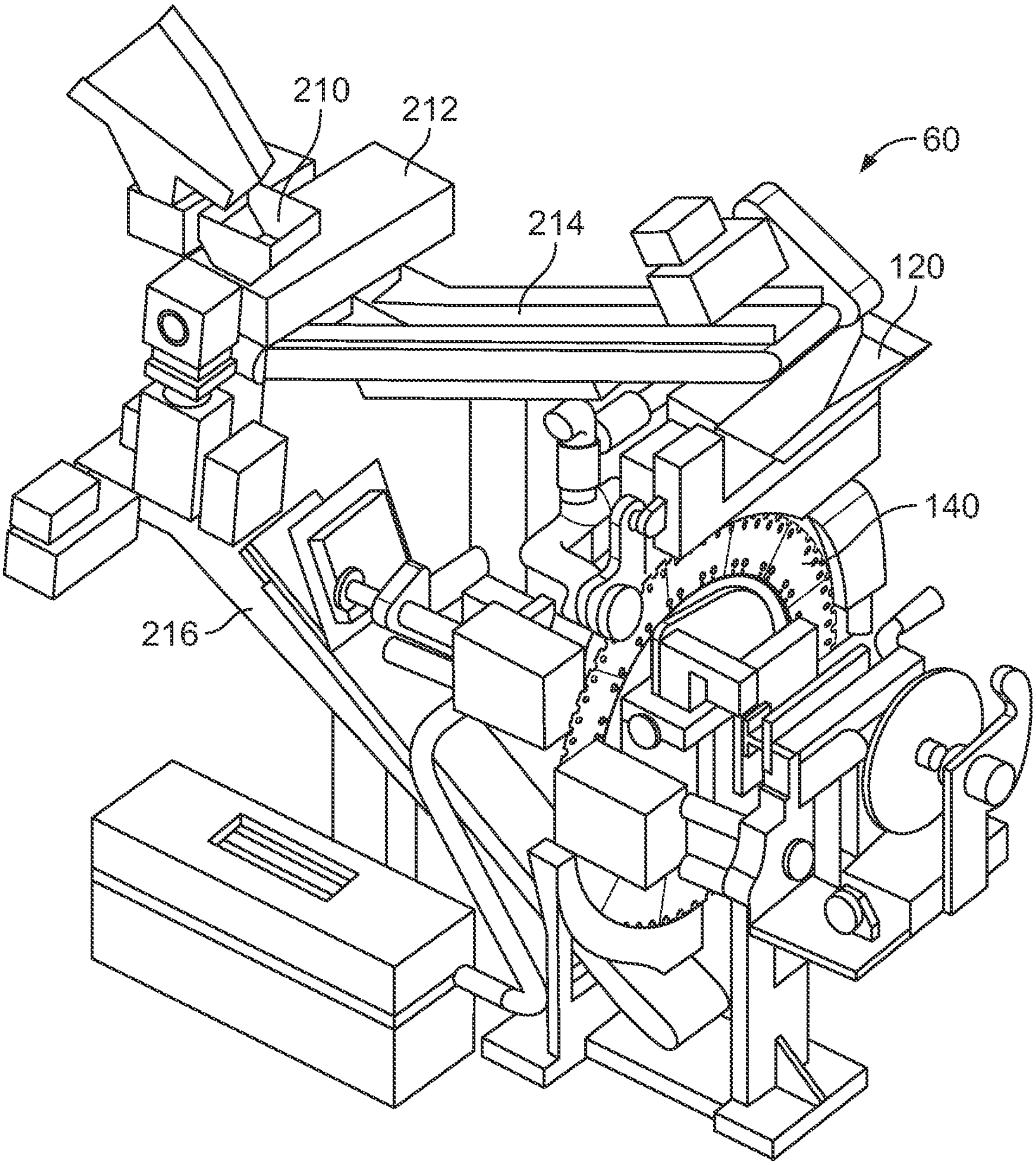
FIG. 6 illustrates a perspective view of a system for marking tablet-shaped articles in accordance with the disclosed subject matter.

Systems and methods in accordance with the disclosed subject matter can include additional features, for example, to integrate the systems and methods into existing manufacturing operations. For example, and with reference to the non-limiting exemplary system depicted in FIG. 6, systems in accordance with the disclosed subject matter can include an input hopper 210 for receiving tablet-shaped articles and a sizing roller assembly 212 to remove tablet-shaped articles having sizes or shapes different from the tablet-shaped articles desired for marking or printing. Systems in accordance with the disclosed subject matter can further include a feed conveyor 214 to convey tablet-shaped articles of the desired size, shape, or characteristics, from the sizing roller 212 to the hopper 120 for printing. Additionally or alternatively, systems can include an exit conveyor 216 to convey tablet-shaped articles that have been printed from the conveyor 140 to another area for further processing, or to a collection location.

As described above, systems and methods in accordance with the disclosed subject matter can have improved performance characteristics. For example, systems in accordance with the disclosed subject matter can have fewer moving parts compared to prior art printers and can be operated reliably with less maintenance downtime of operation. For example, the outer wheel portions of the rotary wheel conveyor can be easily removed from the conveyor for cleaning, whereas prior art printing systems often use conveyor belts with additional components, such as backing plates and chain assemblies that may require additional maintenance and downtime. In addition, systems in accordance with the disclosed subject matter can have a compact profile that can be particularly suitable for mobile applications. Additionally, systems and methods in accordance with the disclosed subject matter can print more accurately than prior art printers. For example, rotary wheel conveyors, with a rigid wheel directly driven by a gear motor can provide better position tolerance for positioning tablet-shaped articles relative to the printing heads.

What is claimed is:

1. A system for marking tablet-shaped articles, the system comprising:

a hopper configured to receive at least one tablet-shaped article, the hopper including an article aligner disposed proximate an exit path of the hopper, wherein the article aligner comprises a bottom panel and two side panels extending therefrom, wherein there is a bottom opening defined in the bottom panel proximate to a closed end of the article aligner and configured to dispense tablet-shaped articles;

a conveyor having opposing first and second side portions, at least one pocket defined in the conveyor between the opposing first and second side portions, the conveyor configured to receive from the article aligner of the hopper the tablet-shaped article in the at least one pocket;

a first window defined in the first side portion, the first window comprising an opening between the pocket and an external environment;

a first printing head adjacent the first side portion of the conveyor, the first printing head configured to mark the tablet-shaped article conveyed from the hopper through the first window;

an inspection station configured to detect a presence of a marking on the tablet-shaped article and instruct the first printing head to mark the tablet-shaped article when no marking is detected; and an article rotator configured to rotate the at least one tablet-shaped article to orient an unmarked face of the tablet-shaped article towards the first side portion of the conveyor when a marking is detected by the inspection system.

2. The system of claim 1, wherein the article aligner defines a channel having a longitudinal dimension, wherein a width dimension of the channel is greater than a thickness dimension of articles to be dispensed from the hopper and less than a width dimension of the articles to be dispensed from the hopper.

3. The system of claim 1, wherein the conveyor is a rotary wheel conveyor, wherein the rotary wheel conveyor includes a plurality of outer wheel portions along an outer periphery thereof, wherein each of the plurality of outer wheel portions is removable from the rotary wheel conveyor and configured to be replaced by another outer wheel portion, wherein the at least one pocket is defined in at least one of the plurality of outer wheel portions.

4. The system of claim 1, wherein the pocket comprises a U-shape in front view.

5. The system of claim 1, wherein the conveyor includes at least one pressure port in communication with the at least one pocket.

6. The system of claim 1, wherein a second window is defined in the second side portion, the second window defining a second opening between the pocket and the external environment, and wherein the system includes a second printing head adjacent the second side portion, the second printing head configured to mark the tablet-shaped article through the second window.

7. The system of claim 1, wherein the first printing head includes at least one of an inkjet printer, laser printer, and laser etching-printer.

8. The system of claim 1, further comprising a central processing unit (CPU), wherein the CPU is configured to store inspection data and instruct the first printing head to apply printing.

9. The system of claim 1, further comprising an exit conveyor configured to convey tablet-shaped articles that have been printed from the rotary wheel conveyor to another area for further processing or to a collection location.

10. The system of claim 1, further comprising wherein the article rotator comprises a robotic manipulating device configured to rotate the tablet-shaped article in the at least one pocket relative to the first printing head.

11. A method for marking tablet-shaped articles, the method comprising:

providing a system for marking tablet-shaped articles, the system including:

a hopper, the hopper including an article aligner disposed proximate an exit path of the hopper, wherein the article aligner comprises a bottom panel and two side panels extending therefrom, wherein there is a bottom opening defined in the bottom panel proximate to a closed end of the article aligner and configured to dispense tablet-shaped articles;

a conveyor, the conveyor having opposing first and second side portions, at least one pocket defined in the conveyor between the first and second side portions;

a first window defined in the first side portion, the first window comprising an opening between the pocket and an external environment;

a first printing head adjacent the first side portion of the conveyor; and an inspection station;

disposing at least one tablet-shaped article in the hopper;

dispensing the at least one tablet-shaped article from the hopper into the at least one pocket defined in the conveyor;

conveying the at least one tablet-shaped article from the hopper to the first printing head, wherein conveying the at least one tablet-shaped article includes detecting the presence of a marking on the tablet-shaped article with the inspection station and instructing the first printing head to mark the tablet-shaped article when no marking is detected;

rotating the at least one tablet-shaped article to orient an unmarked face of the tablet-shaped article towards the first side portion of the conveyor when a marking is detected; and marking the at least one tablet-shaped article with the first printing head, wherein the first printing head marks the at least one tablet-shaped article through the first window.

12. The method of claim 11, wherein dispensing the at least one tablet-shaped article includes passing the tablet-shaped article through the article aligner.

13. The method of claim 11, wherein the conveyor is a rotary wheel conveyor, wherein the rotary wheel conveyor rotationally transfers the at least one tablet-shaped article from the hopper.

14. The method of claim 11, wherein the rotary wheel conveyor includes at least one pressure port in communication with the at least one pocket, and wherein conveying the at least one tablet-shaped article includes applying a vacuum to the pressure port to retain the at least one tablet-shaped article in the at least one pocket.

15. The method of claim 14, further comprising applying a positive pressure to the pressure port to eject the at least one tablet-shaped article from the conveyor.

16. The method of claim 11, wherein the system includes a second window defined in the second side portion of the conveyor, the second window defining a second opening between the pocket and the external environment, the system further including a second printing head adjacent the second side portion of the conveyor, the method including marking the at least one tablet-shaped article through the second window with the second printing head.

* * * * *